(12) United States Patent
Laing et al.

(10) Patent No.: US 7,325,394 B2
(45) Date of Patent: Feb. 5, 2008

(54) SYSTEM AND METHOD FOR DESULFATING A NOX TRAP

(75) Inventors: Paul Laing, Canton, MI (US); Yisun Chang, Ann Arbor, MI (US); Robert Hammerle, Franklin, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 11/380,606

(22) Filed: Apr. 27, 2006

(65) Prior Publication Data

US 2007/0251215 A1 Nov. 1, 2007

(51) Int. Cl.
*F01N 3/00* (2006.01)
(52) U.S. Cl. .............................. 60/295; 60/274; 60/285; 60/297
(58) Field of Classification Search ................. 60/274, 60/277, 285, 286, 295, 297, 300, 301
See application file for complete search history.

(56) References Cited

U.S. PATENT DOCUMENTS

| | | | |
|---|---|---|---|
| 5,974,788 A | 11/1999 | Hepburn et al. | |
| 6,205,773 B1 * | 3/2001 | Suzuki | 60/276 |
| 6,327,848 B1 * | 12/2001 | Poggio et al. | 60/276 |
| 6,327,849 B1 | 12/2001 | Sugiura et al. | |
| 6,378,297 B1 * | 4/2002 | Ito et al. | 60/284 |
| 6,571,551 B2 * | 6/2003 | Lundgren et al. | 60/298 |
| 6,637,198 B2 * | 10/2003 | Hertzberg | 60/295 |
| 6,672,052 B2 * | 1/2004 | Taga et al. | 60/285 |
| 6,843,052 B2 * | 1/2005 | Hertzberg et al. | 60/274 |
| 7,013,637 B2 * | 3/2006 | Yoshida | 60/285 |
| 7,063,642 B1 * | 6/2006 | Hu et al. | 477/100 |
| 2004/0025499 A1 | 2/2004 | Nakatani et al. | |
| 2005/0109014 A1 | 5/2005 | Hayashi | |
| 2006/0010859 A1 * | 1/2006 | Yan et al. | 60/286 |

* cited by examiner

*Primary Examiner*—Tu M. Nguyen
(74) *Attorney, Agent, or Firm*—Allan J. Lippa; Alleman Hall McCoy Russell & Tuttle LLP

(57) ABSTRACT

In an apparatus having an internal combustion engine and a catalytic device for treating $NO_x$ emissions from the internal combustion engine, a method of operating the engine comprising operating the engine for a first interval in such a manner as to store and reduce $NO_x$ emissions in the catalytic device thereby accumulating stored sulfur in the catalytic device, and operating the engine for a second interval in such a manner as to remove a portion of the stored sulfur from the catalytic device and to leave a substantial portion of stored sulfur in the catalytic device.

19 Claims, 5 Drawing Sheets

SYSTEM AND METHOD FOR DESULFATING A NOX TRAP

BACKGROUND AND SUMMARY

Various mechanisms have been developed to reduce $NO_x$ emissions from lean-burning engines. One mechanism uses a catalyst known as a $NO_x$ trap. The $NO_x$ trap is a catalytic device typically positioned downstream of another catalytic converter in an emissions system, and is configured to retain $NO_x$ when the engine is running a lean air/fuel mixture for eventual reduction when the engine runs a more fuel rich air/fuel mixture. A typical $NO_x$ trap includes an alkali or alkaline metal, such as potassium or barium, which adsorbs $NO_x$ when the engine is running a lean air/fuel mixture. The engine can then be configured to periodically run a richer air/fuel mixture to produce carbon monoxide, hydrogen gas and various hydrocarbons to reduce the $NO_x$ in the trap, thus decreasing $NO_x$ emissions and regenerating the trap.

The use of a $NO_x$ trap can substantially reduce $NO_x$ emissions from a lean-burning engine with either spark or compression ignition. However, $NO_x$ traps are also susceptible to poisoning from sulfur in fuels, which may adsorb to the $NO_x$ adsorption sites in the form of sulfate ($SO_4^{2-}$) or other adsorbed or stored sulfur compounds. Stored sulfur may prevent $NO_x$ from adsorbing to trap surfaces, thereby impeding proper trap performance.

Various methods of desulfating $NO_x$ traps may be used. In general, these methods involve heating the $NO_x$ trap to a temperature sufficient to allow the reduction of stored sulfur, and then producing a rich exhaust to reduce it to sulfur dioxide ($SO_2$) or hydrogen disulfide ($H_2S$). A rich/lean oscillation may be used during desulfation to help reduce hydrogen disulfide emissions. However, heating the trap to the temperatures used for desulfation and maintaining the elevated temperatures may cause the $NO_x$ absorption material in the trap to coarsen and degrade. This process may be referred to as thermal aging, and may degrade trap performance.

The inventors herein have realized that desulfation of a catalytic device may be more efficiently performed by operating the engine for a first interval in such a manner as to store and reduce $NO_x$ emissions in the catalytic device, thereby accumulating stored $SO_x$ in the catalytic device, and operating the engine for a second interval in such a manner as to remove a portion of the stored sulfur from the catalytic device while leaving a substantial portion of stored sulfur in the catalytic device. Such a procedure may provide for good $NO_x$ trap performance while reducing thermal aging caused by desulfation, as the rate of sulfur removal is highest during the initial portions of a desulfation process and decreases as the desulfation process progresses. Therefore, such a procedure may be used to remove sufficient sulfur for proper trap performance while reducing an amount of time the trap is subjected to potentially damaging desulfation temperatures.

DETAILED DESCRIPTION OF THE DEPICTED EMBODIMENTS

Figure 1:
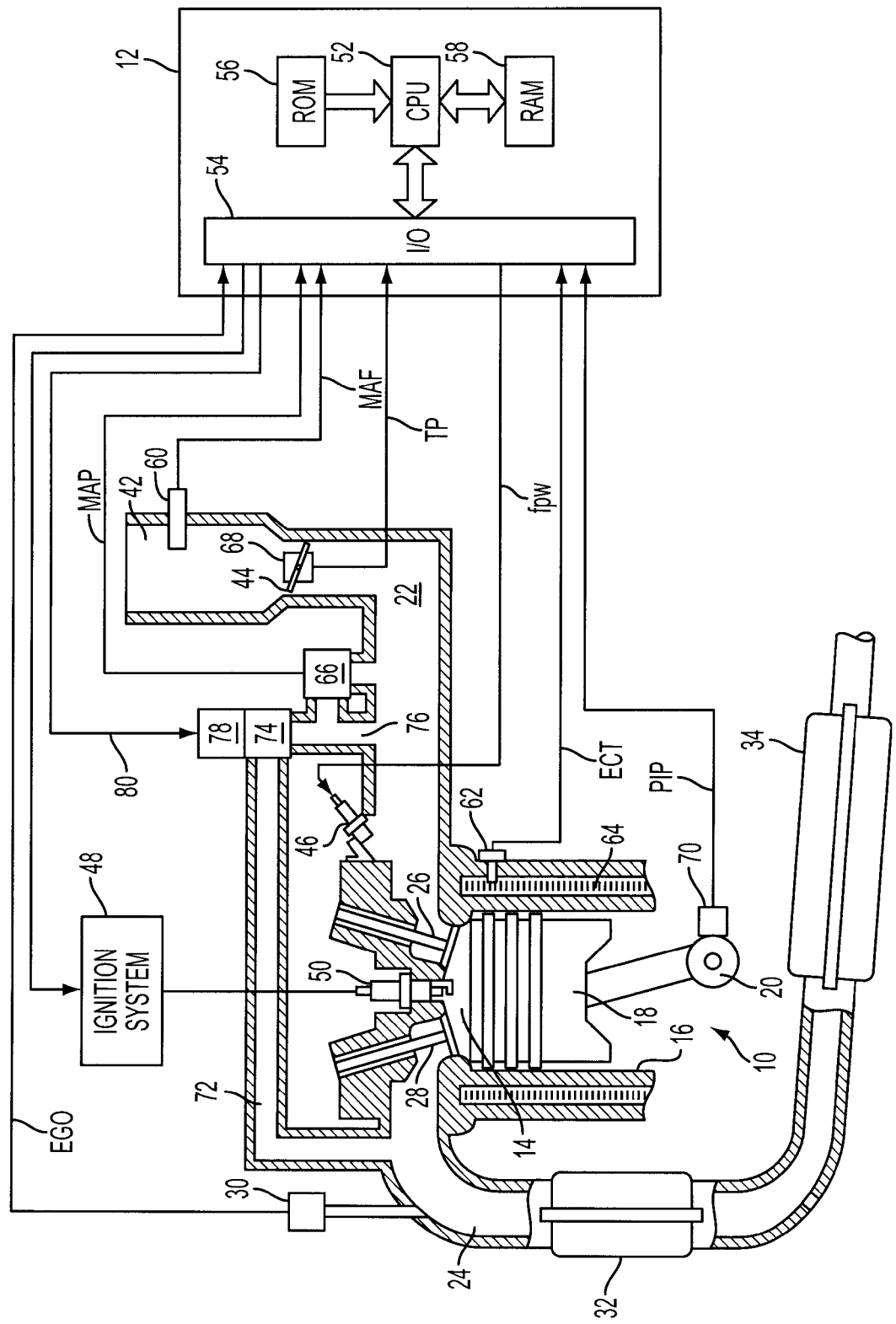
FIG. 1 shows a schematic depiction of an exemplary embodiment of an internal combustion engine.

FIG. 1 shows a schematic depiction of an exemplary embodiment of an internal combustion engine 10. Engine 10 is depicted as a port-injection spark-ignition gasoline engine. However, it will be appreciated that the systems and methods disclosed herein may be used with any other suitable engine, including direct-injection engines, and compression ignition engines including but not limited to diesel engines. Engine 10 typically includes a plurality of cylinders, one of which is shown in FIG. 1, and is controlled by an electronic engine controller 12. Engine 10 includes a combustion chamber 14 and cylinder walls 16 with a piston 18 positioned therein and connected to a crankshaft 20. Combustion chamber 14 communicates with an intake manifold 22 and an exhaust manifold 24 via a respective intake valve 26 and exhaust valve 28. An exhaust gas oxygen sensor 30 is coupled to exhaust manifold 24 of engine 10. A catalyst 32, which can be a three-way for a gasoline vehicle, or an oxidation catalyst for a diesel engine, is connected to and receives feedgas from exhaust manifold 24, and a $NO_x$ trap 34 is connected to and receives emissions from three-way catalyst 32.

For a gasoline engine, the intake manifold 22 communicates with a throttle body 42 via a throttle plate 44. Intake manifold 22 is also shown having a fuel injector 46 coupled thereto for delivering fuel in proportion to the pulse width of signal (fpw) from controller 12. Fuel is delivered to fuel injector 46 by a conventional fuel system (not shown) including a fuel tank, fuel pump, and fuel rail (not shown). Engine 10 further includes a conventional distributorless ignition system 48 to provide an ignition spark to combustion chamber 14 via a spark plug 50 in response to controller 12. In the embodiment described herein, controller 12 is a conventional microcomputer including: a microprocessor unit 52, input/output ports 54, an electronic memory chip 56, which may be electronically programmable memory, a random access memory 58, and a conventional data bus.

Controller 12 receives various signals from sensors coupled to engine 10, in addition to those signals previously discussed, including: measurements of inducted mass air flow (MAF) from a mass air flow sensor 60 coupled to throttle body 42; engine coolant temperature (ECT) from a temperature sensor 62 coupled to cooling jacket 64; a measurement of manifold pressure (MAP) from a manifold absolute pressure sensor 66 coupled to intake manifold 22; a measurement of throttle position (TP) from a throttle position sensor 68 coupled to throttle plate 44; and a profile ignition pickup signal (PIP) from a Hall effect sensor 70 coupled to crankshaft 40 indicating an engine speed (N).

Exhaust gas is delivered to intake manifold 22 by a conventional EGR tube 72 communicating with exhaust manifold 24, EGR valve assembly 74, and EGR orifice 76. Alternatively, tube 72 could be an internally routed passage in the engine that communicates between exhaust manifold 24 and intake manifold 22.

As described above, sulfur may accumulate over time in $NO_x$ trap 34, binding to the $NO_x$ absorption sites and thereby hindering trap performance. Therefore, controller 12 may include instructions stored in memory thereon and executable by processor 52 to periodically operate the engine in such a manner as to remove adsorbed sulfur from $NO_x$ adsorption sites. Typical desulfation processes involve first heating the $NO_x$ trap, for example, by adjusting an air/fuel ratio to cause exothermic catalytic reactions in the trap, and then providing a rich exhaust to the trap for the reduction of adsorbed $SO_x$. A rich/lean oscillation during $SO_x$ reduction may be used to help reduce hydrogen sulfide production.

Due at least partly to the fuel cost of heating the $NO_x$ trap to desulfation temperatures, conventional desulfation processes have involved allowing sulfur to accumulate until a maximum level at which the $NO_x$ trap performance is no longer satisfactory is reached, and then trying to remove as much sulfur as possible during a desulfation process so that subsequent desulfation processes are delayed as much as possible.

While such a scheme may improve the fuel economy of the vehicle, it also may contribute to the thermal aging of the $NO_x$ trap. This is because the elevated temperatures used in operating and desulfating $NO_x$ trap 34, which may be on the order of 600-700 degrees Celsius, may cause a coarsening of the active materials within $NO_x$ trap 34, and thereby may reduce the number of $NO_x$ adsorption sites within $NO_x$ trap 34. Excessive thermal aging may cause the performance of $NO_x$ trap 34 to degrade.

The degree of thermal aging of a trap may be a function of the amount of time the trap is subjected to desulfation temperatures. Therefore, removing sulfur at a higher rate may allow desulfation to be performed more quickly, thereby helping to reduce the rate of thermal aging of the trap.

Many parameters may affect the removal rate of sulfur from a $NO_x$ trap. Examples include, but are not limited to, exhaust temperature, concentration of reductant(s) in the exhaust, and the level of sulfur accumulated on the $NO_x$ trap. In general, sulfur removal rates increase with increasing exhaust temperature, larger concentrations of reductant, and higher levels of sulfur stored on the $NO_x$ trap.

Figure 2:
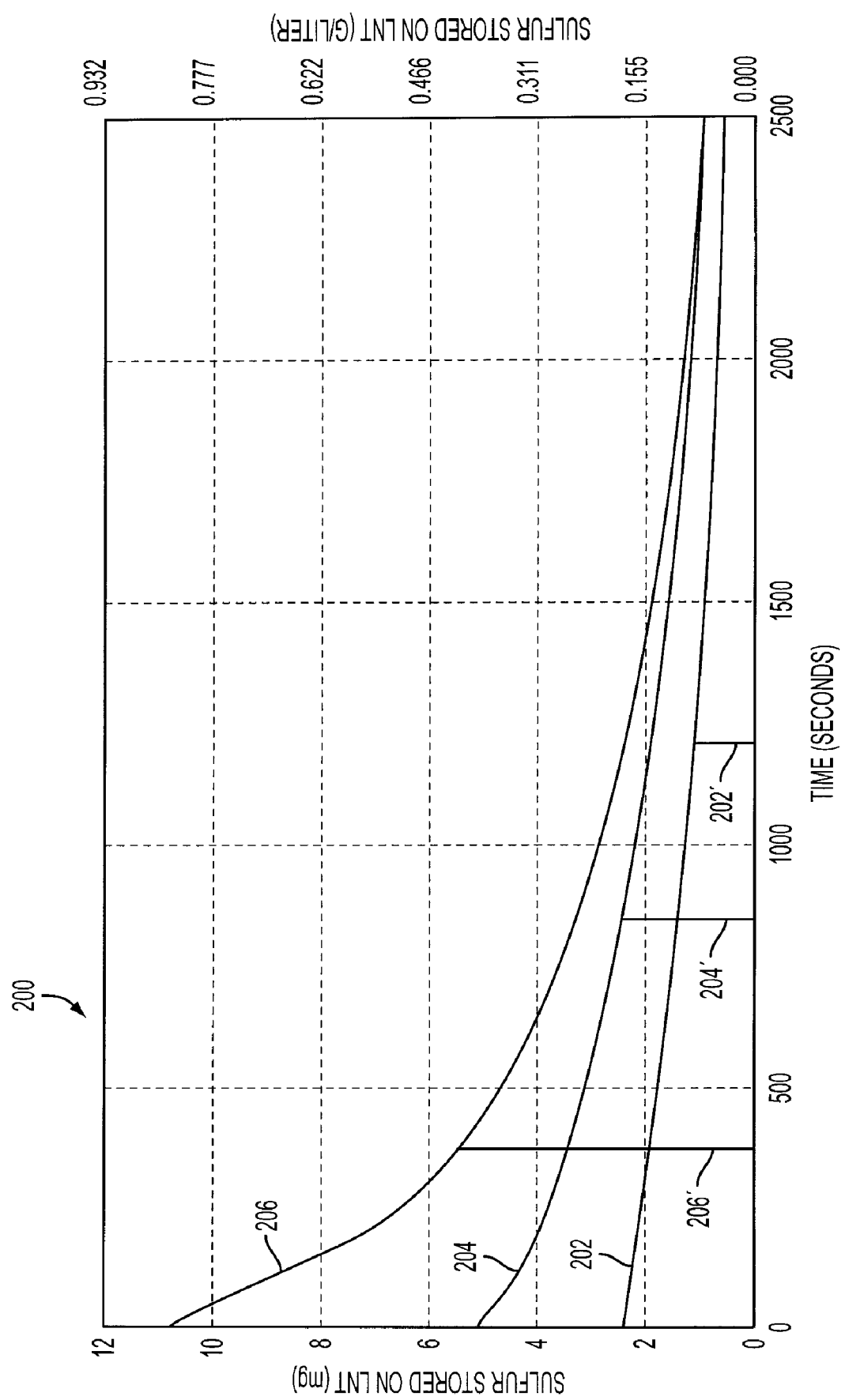
FIG. 2 shows a graph representing a quantity of sulfur removed from a $NO_x$ trap as a function of time and of initial trap sulfur loading.

FIG. 2 shows a graph 200 demonstrating variation in a rate of removal of sulfur from a $NO_x$ trap as a function of an amount of sulfur stored in the trap. In a series of experiments, a trap was loaded with sulfur for ½ hour prior to the desulfation process represented by line 202; for 1 hour prior to the desulfation process represented by line 204; and for 1½ hours prior to the desulfation process represented by line 206. The same desulfation process, namely using the same temperatures and the same reductant conditions, was started for each group of data at time zero. As can be seen from a comparison of the slopes of line 206 compared to 204 and 202, sulfur is removed at a higher rate when higher quantities of sulfur are present, and sulfur removal slows as more and more sulfur is removed from the trap. Furthermore, the time needed to remove half of the sulfur from the trap, which is indicated at 202', 204' and 206' for lines 202, 204 and 206 respectively, becomes shorter for higher sulfur loadings. Thus, the greatest portion of sulfur may be removed early in a desulfation process. The later portion of a conventional full desulfation processes may remove relatively little sulfur for the amount of time spent at the desulfation temperature. This suggests that a desulfation process that terminates earlier than conventional desulfation processes and that initiates desulfation at a higher sulfur loading level may be employed to reduce the amount of time the $NO_x$ trap is exposed to elevated temperatures.

Figure 3:
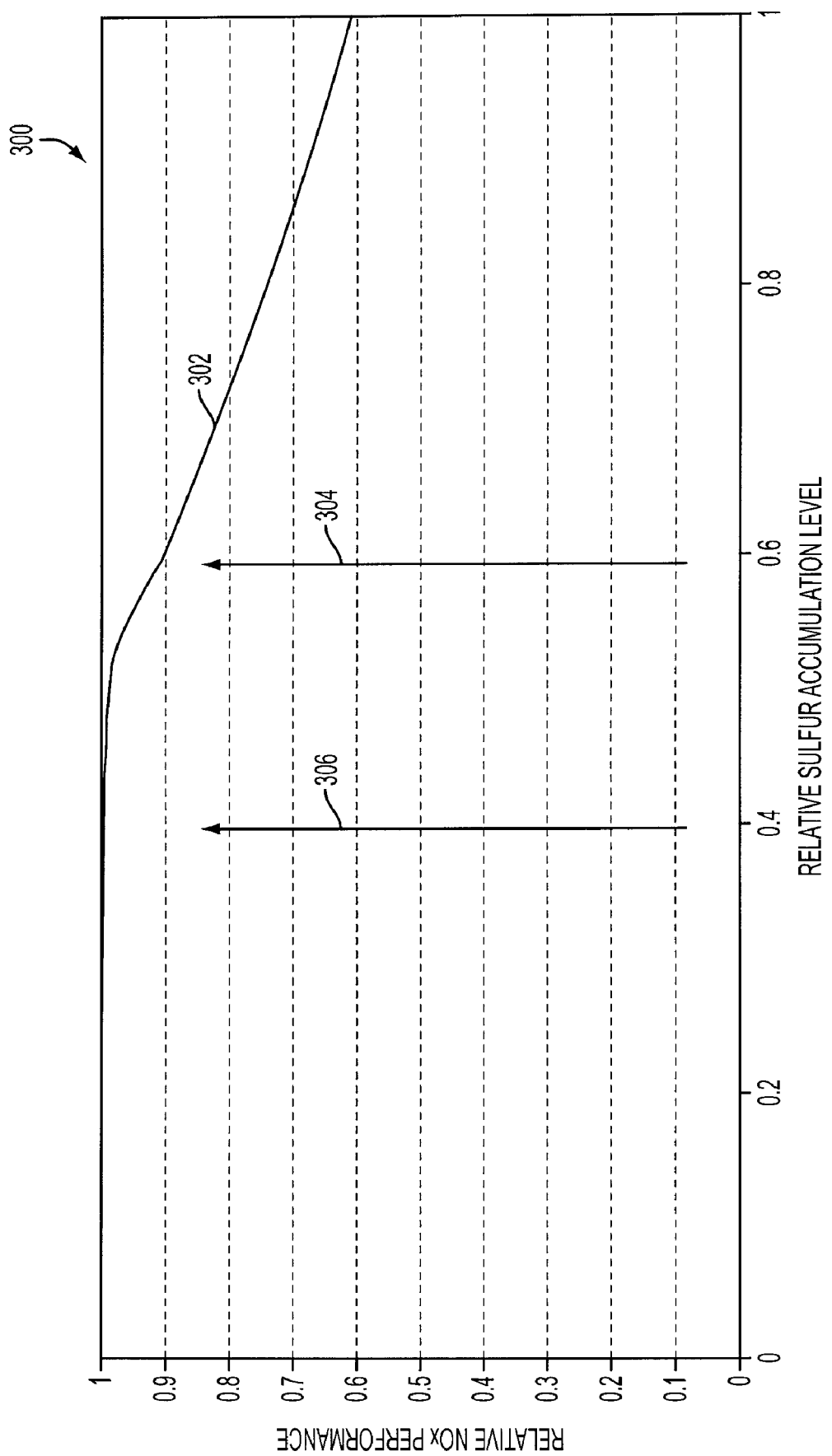
FIG. 3 shows a graph representing a relative $NO_x$ treatment performance of a $NO_x$ trap as a function of a relative sulfur accumulation in the trap.

The early termination of a desulfation process may result in a larger quantity of residual sulfur being left in the trap than conventional processes. However, some concentration of stored sulfur in $NO_x$ trap 34 may have little impact on the $NO_x$ emissions treatment capabilities of $NO_x$ trap 34. FIG. 3 shows a plot 300 of the relative $NO_x$ performance level of an exemplary $NO_x$ trap compared to a relative level of sulfur accumulation in the trap. The relative $NO_x$ performance is a normalized $NO_x$ conversion efficiency, and the relative sulfur level is a normalized stored sulfur concentration. A relative $NO_x$ performance level of one indicates the $NO_x$ treatment performance of a sulfur-free trap. Line 302 illustrates the relationship between $NO_x$ trap performance and relative sulfur loading.

Generally, at the end of a typical desulfation period, the sulfur accumulation level is below 0.25 and the NOx performance is high, as indicated by the left side of line 302. From FIG. 3, it can be seen that the initial buildup of sulfur in the $NO_x$ trap has little effect on the $NO_x$ treatment performance of the $NO_x$ trap up to a certain threshold. Upon reaching this threshold, which is around a relative sulfur accumulation level of 0.5-0.55 in FIG. 3, performance degrades more rapidly, and eventually reaches a preselected minimum performance level at which desulfation is performed. Any suitable level may be used as the minimum performance level. Examples include, but are not limited to, relative $NO_x$ performance levels of approximately 0.85-0.95, which corresponds to a relative sulfur accumulation of approximately 0.6, as indicated by arrow 304 in FIG. 3. Alternatively, minimum performance levels either below or above this range may be used.

As mentioned above, conventional desulfation methods typically involve the removal of as much sulfur as practicable during each desulfation event. Removal of all stored sulfur is typically the goal of conventional desulfation methods. However, as shown in FIG. 2, the rate of sulfur removal drops as the quantity of accumulated sulfur decreases. Therefore, referring again to FIG. 3, conventional desulfation methods may sometimes be terminated when a relative sulfur level of approximately 0.1-0.2 is reached, rather than going completely to zero stored sulfur. The term "substantially complete removal" may be used herein to refer to that amount of sulfur removed via conventional desulfation processes that attempt to remove as much sulfur as possible, and may include those desulfation processes that leave behind relative sulfur levels of 0.1-0.2.

From FIG. 3, it can be seen that the additional $NO_x$ performance gained by the removal of sulfur past a relative sulfur level of approximately 0.4 may be substantially less than the additional $NO_x$ performance gained by reducing the relative sulfur levels from approximately 0.6 to approximately 0.4, as indicated by lines 304 and 306 in FIG. 3. Furthermore, the greater relative amount of time spent reducing the sulfur level from approximately 0.4 to approximately 0.1-0.2 may contribute more to trap aging than the time spent reducing the relative sulfur level from approximately 0.6 to approximately 0.4. Therefore, good $NO_x$ trap performance with a relative reduction in thermal aging may be achieved via a strategy wherein only a portion of sulfur is removed during a desulfation process. The term "only a portion" of sulfur generally corresponds to a portion sufficient to return the trap performance to a performance level suitable for satisfactory $NO_x$ trap performance. Likewise, the term "substantial portion" may refer to an amount of stored sulfur remaining in the trap after performing a desulfation process according to the present disclosure. In some embodiments, the trap performance level may be returned to a level substantially similar to that of a substantially sulfur-free trap. Examples of such performance levels include, but are not limited to, $NO_x$ performance levels of approximately 0.95-0.99, and/or relative sulfur levels of 0.35-0.5.

Figure 4:
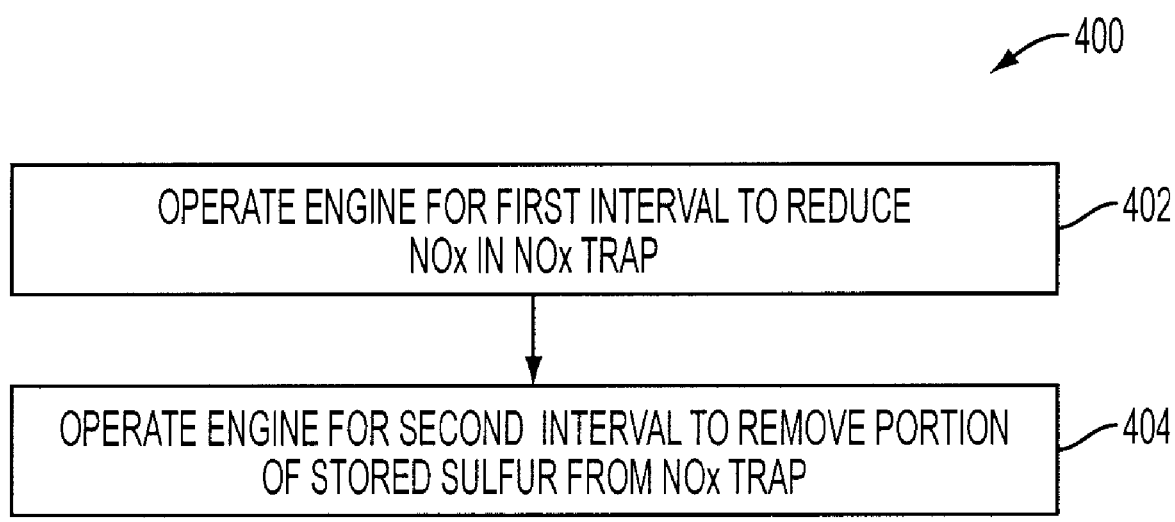
FIG. 4 shows a flow diagram of an exemplary embodiment of a method for desulfating a $NO_x$ trap.

FIG. 4 illustrates an exemplary embodiment of a method 400 of desulfating $NO_x$ trap 34 that may help to slow the thermal aging of a $NO_x$ trap relative to conventional desulfation methods. Method 400 first includes, at 402, operating engine 10 for a first interval in such a manner as to cause $NO_x$ trap 34 to store and reduce $NO_x$ emissions. For example, the first interval of engine operation may be a lean-burning period configured to provide good fuel economy. During this first period of operation, sulfur may collect in $NO_x$ trap 34. Therefore, method 400 next includes, at 404, operating engine 10 for a second interval in such a manner as to remove stored sulfur from $NO_x$ trap 34, wherein the second interval is of a duration to remove a portion of the stored sulfur from $NO_x$ trap 34 and to leave a substantial amount of sulfur in the trap. The portion of sulfur removed is generally sufficient to return the $NO_x$ trap performance to a suitable level for proper emissions control. In some embodiments, the relative performance level may be returned to a level substantially similar to that of a substantially sulfur-free trap. For example, a portion of sulfur may be removed that is sufficient to return the relative $NO_x$ performance to a relative value of 0.95-0.99. Method 400 may allow $NO_x$ trap 34 to be exposed to desulfation temperatures for a smaller fractional portion of an operating interval than conventional $NO_x$ trap desulfation processes, even where method 400 is repeated at a more frequent interval than a conventional method. Furthermore, as described above, the partial removal of sulfur from the $NO_x$ trap may not affect the performance of the $NO_x$ to a detrimental extent.

Method 400 utilizes the $NO_x$ trap performance and sulfur removal properties illustrated in FIGS. 2 and 3 to maintain an adequate level of $NO_x$ trap performance while subjecting the $NO_x$ trap to detrimental desulfation temperatures for a lesser duration than conventional desulfation temperatures. For example, by removing only a portion of stored sulfur from $NO_x$ trap 34, method 400 may take advantage of the higher sulfur removal rates that occur at higher sulfur loadings and at the same time may help to avoid subjecting $NO_x$ trap 34 to the elevated desulfation temperatures for the durations used in conventional desulfation processes. Method 400 may be configured to operate in the region of those relative sulfur accumulation levels that are just beginning to cause a steeper decrease in the relative $NO_x$ performance of the trap, thereby maintaining good $NO_x$ trap performance while achieving higher rates of sulfur removal.

Figure 5:
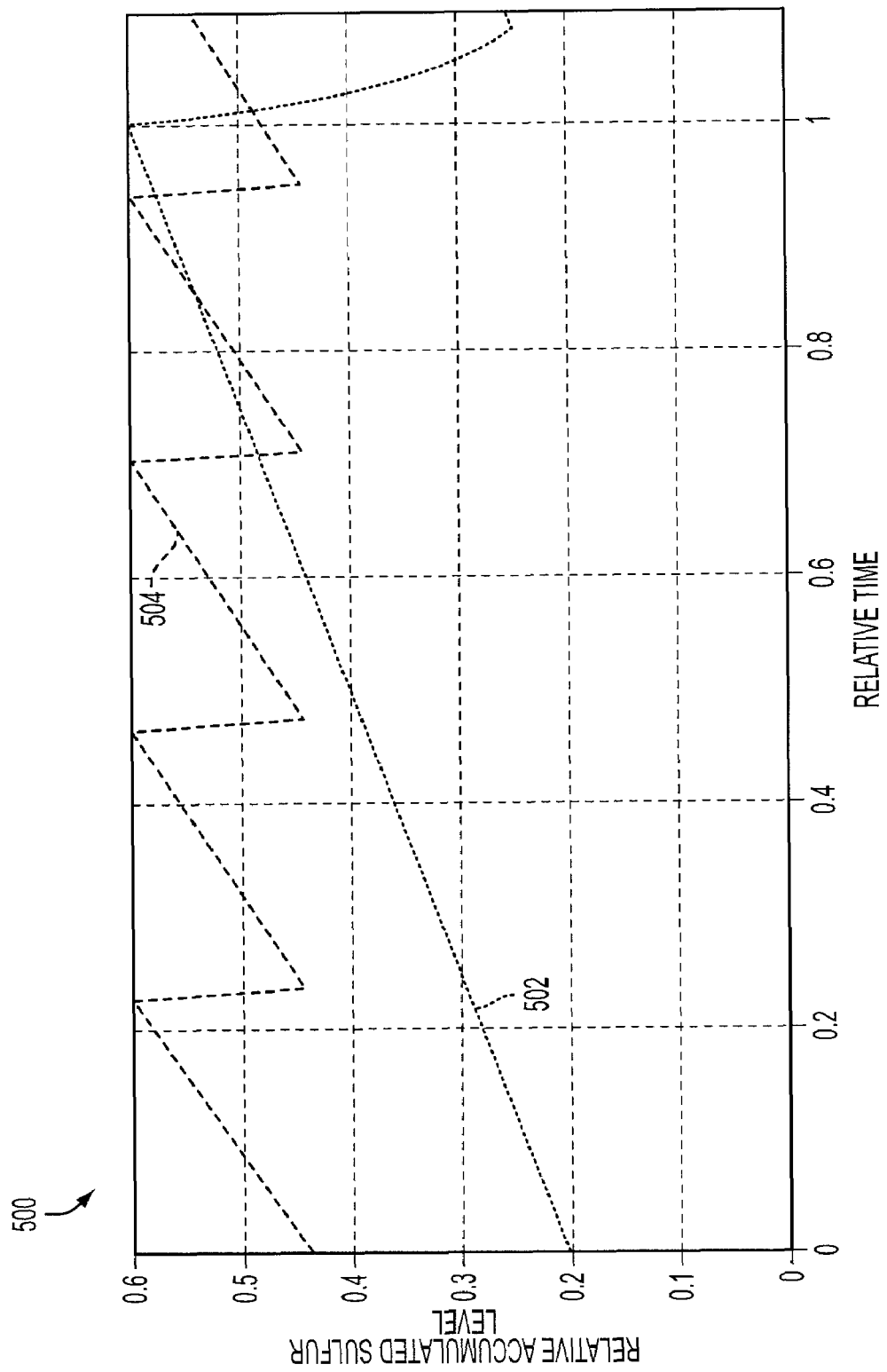
FIG. 5 shows a graph representing a relative sulfur accumulation in a $NO_x$ trap as a function of relative time for two exemplary desulfation processes.

FIG. 5 shows a plot 500 of relative sulfur accumulation levels as a function of time for an exemplary implementation of this method 504 and for a conventional desulfation process 502. A relative accumulation of sulfur of 0.6 is used as an exemplary threshold level for triggering a desulfation process for each depicted process, and a relative time of 1 indicates the time (or any other suitable interval, such as engine cycles) that passes between the conclusion of a conventional desulfation event and the beginning of a subsequent conventional desulfation event. The desulfation process shown by line 504 is performed four full times during the single sulfation/desulfation cycle shown by line 502. The total time required for the single desulfation event shown in 502 is approximately 0.08 relative time units, wherein the total time required for the four desulfation events of 504 is 0.032 relative time units (0.008 relative time units for each event). Therefore, even though desulfation is performed more frequently in the exemplary implementation of method 504 than in the conventional desulfation method 502, the total exposure time to the high temperature level is reduced almost by a factor of 2 for the implementation of method 504. This reduction in exposure time to high temperatures may greatly increase the lifetime of the $NO_x$ trap.

Even though the time at high temperature is less for process 504 than process 502, the fuel economy penalty for the more frequent desulfation processes may be greater due to the heat required to raise the $NO_x$ trap temperature for the three additional desulfations. Any increased fuel penalty can be balanced with the desired increase in the activity of the $NO_x$ trap to determine an appropriate interval at which to perform desulfation processes. While the embodiment depicted at 504 in FIG. 5 performs four desulfation events in a shorter interval than the conventional desulfation process shown at 502, it will be appreciated that a desulfation method according to the present disclosure may involve performing either more or fewer desulfation events than the four shown in FIG. 5. For example, two or three desulfation events maybe performed during this interval, or alternatively five or more may be performed.

Furthermore, the intervals between desulfation events and the intervals defining the duration of the desulfation events may have any suitable length. For example, either or both intervals may be of fixed length. Alternatively, either or both intervals may be based upon a diagnostic measurement of $NO_x$ trap performance, a measurement or estimate of the sulfur loading of the $NO_x$ trap, etc. Where the intervals are of fixed length, the length of the intervals may be adjusted over time to compensate for thermal and/or chemical aging of the $NO_x$ trap.

The embodiments of systems and methods disclosed herein for desulfating a $NO_x$ trap are exemplary in nature, and these specific embodiments are not to be considered in a limiting sense, because numerous variations are possible. The subject matter of the present disclosure includes all novel and non-obvious combinations and subcombinations of the various systems and methods for desulfating a $NO_x$ trap, and other features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the various features, functions, elements, and/or properties disclosed herein may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. In an apparatus having an internal combustion engine and a catalytic device for treating $NO_x$ emissions from the internal combustion engine, a method of operating the engine, comprising:

accumulating sulfur in the catalytic device for a first interval by operating the engine in such a manner as to store and reduce $NO_x$ emissions in the catalytic device during the first interval;

ending the first Interval when a first measure of sulfur is accumulated in the catalytic device;

desulfating the catalytic device for a second interval by operating the engine in such a manner as to remove a portion of sulfur from the catalytic device during the second interval, wherein sulfur is removed at a higher rate during the second interval than during an interval used to fully desulfate the catalytic device via a single desulfation process; and, ending the second interval when a second measure of sulfur remains in the catalytic device, wherein the second measure corresponds to a substantial portion of sulfur remaining in the catalytic device.

2. The method of claim 1, further comprising periodically operating the engine for the first interval and the second interval, wherein each second interval ends when the second measure of sulfur remains in the catalytic device.

3. The method of claim 1, wherein the second interval has a predetermined length.

4. The method of claim 1, wherein the second interval is a predetermined number of engine cycles.

5. The method of claim 1, wherein the engine Is a spark ignition engine.

6. The method of claim 1, wherein the engine Is a compression ignition engine.

7. The method of claim 1, wherein the first measure corresponds to a predetermined performance threshold for the catalytic device to store and reduce NOx emissions.

8. The method of claim 3, wherein the predetermined performance threshold is a relative $NO_x$ conversion efficiency threshold of between approximately 0.85-0.95

9. The method of claim 1, wherein the second measure corresponds to a predetermined threshold of sulfur loading of the catalytic device.

10. The method of claim 9, wherein the predetermined threshold of sulfur loading corresponds to a relative sulfur accumulation level of approximately 0.3-0.5.

11. A method of operating an internal combustion engine having a catalytic device for treating $NO_x$ emissions from the internal combustion engine, comprising:

accumulating sulfur in the catalytic device by operating the engine In such a manner as to store and reduce $NO_x$ emissions in the catalytic device and subsequently desulfating the catalytic device by operating the engine in such a manner as to remove a portion of sulfur from the catalytic device such that a substantial portion of sulfur remains in the catalyst device upon termination of desulfation, where sulfur is removed at a higher rate during the desulfating such that a substantial portion of sulfur remains in the catalyst device upon termination of desulfation, and where the desulfation occurs over a range of sulfur levels stored in the catalyst device, the range spanning only higher levels of sulfur storage; and repeatedly performing the desulfation to remove sulfur more often at higher sulfur storage levels than lower sulfur storage levels.

12. The method of claim 11, wherein the range of sulfur levels corresponds to a range of relative sulfur accumulation levels between approximately 0.4 to 0.7.

13. An apparatus, comprising:

an internal combustion engine;

a catalytic device for treating $NO_x$ emissions from the engine; and a controller for controlling the engine, wherein the controller comprises a processor and a memory, the memory comprising instructions executable by the processor to accumulate sulfur in the catalytic device for a first interval by operating the engine in such a manner as to store and reduce NOx emissions in the catalytic device during the first interval, to end the first interval when a first measure of sulfur is accumulated in the catalytic device, wherein the first measure of sulfur corresponds to a higher sulfur loading, to desulfate sulfur in the catalytic device for a second interval by operating the engine in such a manner as to remove sulfur from the catalytic device during the second interval, wherein sulfur is removed at a higher rate during the second interval than during an interval used to fully desulfate the catalytic device via a single desulfation process, and to end the second interval when a second measure of sulfur remains in the catalytic device wherein the second measure corresponds to a substantial portion of sulfur remaining in the catalytic device.

14. The apparatus of claim 13, wherein the memory further comprises instructions executable by the controller to periodically operate the engine for the first interval and the second interval, wherein each second interval ends when the second measure of sulfur remains in the catalytic device.

15. The apparatus of claim 13, wherein the first measure corresponds to a predetermined performance threshold for the catalytic device to store and reduce NOx emissions.

16. The apparatus of claim 13, wherein the second interval has a predetermined length.

17. The apparatus of claim 13, wherein the second interval is a predetermined number of engine cycles.

18. The apparatus of claim 13, wherein the second measure corresponds to a predetermined threshold of sulfur loading of the catalytic device.

19. The apparatus of claim 18, wherein the predetermined threshold of loading corresponds to a relative sulfur accumulation level of 0.3-0.5.

* * * * *

UNITED STATES PATENT AND TRADEMARK OFFICE
CERTIFICATE OF CORRECTION

PATENT NO. : 7,325,394 B2 Page 1 of 1
APPLICATION NO. : 11/380606
DATED : February 5, 2008
INVENTOR(S) : Paul Laing et al.

It is certified that error appears in the above-identified patent and that said Letters Patent is hereby corrected as shown below:

Title Page section 75, delete "Chang" and insert --Cheng-- therefor.

Signed and Sealed this

Fifth Day of August, 2008

JON W. DUDAS
*Director of the United States Patent and Trademark Office*